(12) United States Patent
Previero (10) Patent No.: US 11,220,026 B2
(45) Date of Patent: Jan. 11, 2022

(54) WASHING AND SEPARATING METHOD AND APPARATUS FOR PLASTICS MATERIALS

(71) Applicant: PREVIERO N. S.R.L., Lissone (IT)

(72) Inventor: Flavio Previero, Lissone (IT)

(73) Assignee: Previero N. S.r.l.

( * ) Notice: Subject to any disclaimer, the term of this patent is extended or adjusted under 35 U.S.C. 154(b) by 281 days.

(21) Appl. No.: 16/307,170

(22) PCT Filed: Jun. 5, 2017

(86) PCT No.: PCT/EP2017/063621
§ 371 (c)(1),
(2) Date: Dec. 5, 2018

(87) PCT Pub. No.: WO2017/211768
PCT Pub. Date: Dec. 14, 2017

(65) Prior Publication Data
US 2019/0134856 A1 May 9, 2019

(30) Foreign Application Priority Data

Jun. 6, 2016 (IT) .......................... UA2016A004127

(51) Int. Cl.
*B29B 17/02* (2006.01)
*B08B 3/10* (2006.01)
(Continued)

(52) U.S. Cl.
CPC ................ *B29B 17/02* (2013.01); *B03B 5/02* (2013.01); *B03B 5/38* (2013.01); *B03B 5/40* (2013.01);
(Continued)

(58) Field of Classification Search
CPC .... B03B 5/40; B03B 5/66; B03B 5/02; B03B 11/00; B03B 5/38; B03B 2011/002;
(Continued)

(56) References Cited

U.S. PATENT DOCUMENTS 3,952,113 A * 4/1976 Cerroni .................. B02C 18/02
426/456
4,033,907 A * 7/1977 Wolf .................... B29B 17/0042
521/40.5
(Continued)

FOREIGN PATENT DOCUMENTS

DE        2804729 A1     8/1979
EP        0090372 A1    10/1983
(Continued)

*Primary Examiner* — Benjamin L Osterhout
(74) *Attorney, Agent, or Firm* — Laubscher & Laubscher, P.C.

(57) ABSTRACT

A method and apparatus for washing and separating pieces of plastics material from contaminants includes supplying to a washing container pieces of plastics material containing contaminating material and an entering flow of washing fluid. A turbulent stirring action to detach and separate mechanically the contaminating material from the plastics material is generated, evacuating through overflowing, through an outlet port An outlet flow of washing fluid and a quantity of plastics material that has undergone the turbulent stirring action is evacuated by overflow through an outlet port. A controlled-conveying and retaining arrangement is driven to retain the plastics material in the washing container and to advance in a controlled manner the quantity of plastics material to the outlet port independently of the advancement of the outlet flow of washing fluid. An adjustable bulkhead is arranged in the washing fluid at a depth with respect to the free surface to divert from the outlet port the pieces of plastics material that, once supplied to the container, by advancing more on the surface, tend to reach (Continued)

the outlet zone of the washings container. The bulkhead guides and forces the pieces of plastics to undergo the turbulent stirring action to separate and detach the adhering contaminants therefrom.

11 Claims, 7 Drawing Sheets

(51) Int. Cl.
| | |
|---|---|
| *B03B 5/66* | (2006.01) |
| *B03B 11/00* | (2006.01) |
| *B03B 5/40* | (2006.01) |
| *B03B 5/38* | (2006.01) |
| *B03B 5/02* | (2006.01) |
| *B29K 105/06* | (2006.01) |
| *B29L 31/00* | (2006.01) |
| *B29L 7/00* | (2006.01) |

(52) U.S. Cl.
CPC ............ *B03B 5/66* (2013.01); *B03B 11/00* (2013.01); *B08B 3/104* (2013.01); *B03B 2011/002* (2013.01); *B29B 2017/0289* (2013.01); *B29K 2105/065* (2013.01); *B29L 2007/008* (2013.01); *B29L 2031/712* (2013.01); *B29L 2031/7158* (2013.01); *Y02W 30/62* (2015.05)

(58) Field of Classification Search
CPC . B08B 3/104; B29B 17/02; B29B 2017/0289; B29K 2105/065; B29L 2007/008; B29L 2031/712; B29L 2031/7158; Y02W 30/62; Y02W 30/622

See application file for complete search history.

(56) References Cited

U.S. PATENT DOCUMENTS

| | | | |
|---|---|---|---|
| 4,073,661 A | 2/1978 | Buzga et al. | |
| 4,196,019 A | 4/1980 | Kohler et al. | |
| 4,379,525 A * | 4/1983 | Nowicki | B29B 17/02 241/20 |
| 4,844,106 A | 7/1989 | Humter et al. | |
| 5,211,841 A * | 5/1993 | Krempp | B29B 17/02 210/86 |
| 6,238,516 B1 * | 5/2001 | Watson | D21B 1/026 162/8 |
| 8,388,873 B2 * | 3/2013 | Hofmann | B03B 9/06 264/37.26 |
| 10,058,898 B2 * | 8/2018 | Gercke | B08B 1/001 |
| 2002/0033550 A1 * | 3/2002 | Suehara | B03B 5/00 264/140 |
| 2003/0010360 A1 * | 1/2003 | Klenk | B29B 17/02 134/25.1 |
| 2013/0146105 A1 * | 6/2013 | Kirchhoff | B08B 3/104 134/32 |

FOREIGN PATENT DOCUMENTS

| | | |
|---|---|---|
| IT | 1375337 | 4/2008 |
| IT | 1382426 | 10/2008 |
| JP | 2009208428 A | 9/2009 |

* cited by examiner

WASHING AND SEPARATING METHOD AND APPARATUS FOR PLASTICS MATERIALS

CROSS REFERENCE TO RELATED APPLICATIONS

This application is a § 371 National Stage Entry of Application No. PCT/EP2017/063621 filed Jun. 5, 2017. PCT/EP2017/063621 claims priority of IT UA2016A004127 filed Jun. 6, 2016, The entire contents of these applications are incorporated herein by reference.

BACKGROUND OF THE INVENTION

This invention relates to a method and to an apparatus for washing and separating plastics materials from contaminants of various type. The plastics, coming from residential and/or industrial waste, once they have been milled or reduced into pieces, are subjected to the washing and separating process in order to enable such plastics materials to be used subsequently as regenerated material. In particular, the pieces of plastics to be processed can come, for example, from plastic films, containers, bottles and other objects.

PRIOR ART

For washing and separating plastics materials from contaminants, numerous appliances are used today that operate according to different operating principles.

A first type of apparatus exists operating with a functioning principle based on washing the plastics material by stirring in a washing chamber and on the subsequent decantation of the contaminants in a quieting chamber separated from the washing chamber by a wall or baffle that extends from above downward in depth for a significant fraction of the height of the tank. An example of an apparatus of this type is disclosed in U.S. Pat. No. 4,196,019. This apparatus comprises an elongated tank that is filled to a set level with a washing fluid and houses a blade stirrer extending horizontally just below the free surface of the fluid. A vertical baffle is provided that extends in depth in the fluid, which divides the tank into a washing zone, hosting the aforesaid blade stirrer, and into a quieting zone. The plastics material that is in the washing zone undergoes the action of the stirrer and subsequently has to advance downwards to pass below the lower edge of the baffle to then move to an upper discharging zone to be evacuated from the tank through a rotating screen-drum at a constant set speed.

Unfortunately, through the aforesaid structural configuration of this apparatus, it may happen that pieces of plastics supplied to the washing zone move immediately to the quieting zone, escaping the stirrer and without being suitably subjected to the washing action by the latter. Further, undesirably, an opposite phenomenon to what has just been disclosed may happen, i.e. that a given plastics material remains trapped in the washing zone without being able to reach the quieting zone to be evacuated; in other words, the baffle can sometimes act as an obstacle for certain types of processed plastics materials that are not able to be dragged by the dynamic action of fluid and remain excessively for an undefined and non-controllable dwell time inside the washing zone.

A similar apparatus, with similar drawbacks, is also disclosed in U.S. Pat. No. 4,073,661.

Another machine that is an improvement on the preceding machines and comprises similarly a washing zone separated from a quieting and evacuating zone and exploiting the different degrees of floating of the materials has been disclosed in the Italian patent 1382426.

Another machine for washing plastics is known from DE2804729.

Alongside the type of apparatuses disclosed above, another type of apparatus exists, to which the apparatus according to this invention is to be ascribed. A known example of this type of apparatus is disclosed in Italian patent 1375337 (application n. IT2006MI02083); this apparatus comprises a container for the washing fluid, having a peripheral wall of cylindrical shape, a frustoconical bottom and an upper lid that in combination define a washing chamber.

An inlet opening for the washing fluid and the plastics material in pieces to be washed, and an outlet opening of the washing fluid and of the plastics material at the end of the washing step.

Inside the washing container, a stirring device extends vertically that is arranged for subjecting the plastics material to the stirring action to detach the contaminants to be eliminated therefrom.

A drawback that is common to all the apparatuses disclosed above, both of the first type and of the second type, is that they are not able to guarantee statistically the same degree of washing action and uniformity of treatment to all the entering pieces of plastics, making it possible for pieces of plastics to pass directly from the inlet to the outlet, thus escaping, undesirably, the washing action.

Further, another drawback of the known apparatuses is that the versatility thereof is no longer considered sufficient in the light of current needs of this technical sector.

OBJECTS OF THE INVENTION

One object of the present invention is to improve current washing and separating systems for plastics materials of any type, whether they come from containers, bottles, or plastics films, reduced into pieces.

Another object is to provide a washing and separating method and apparatus that is able to ensure for the entire processed plastics material a uniformity of treatment, i.e. the same degree of washing.

A further object is to make it possible to decide the best compromise between consumption linked to the process and quality of the obtained material, being able to choose between numerous possible operating modes on the basis of specific needs of the case.

A further object of the present invention is to make it possible to obtain effective, efficient and rapid washing action, by an apparatus that is structurally and functionally simplified with respect to many other more complex and expensive plants of the prior art, that also enables significant energy savings to be achieved.

SHORT DESCRIPTION OF THE DRAWINGS

These and further characteristics of the method and apparatus according to the invention will be clearer from the description that follows, with reference to the drawings, in which.

DETAILED DESCRIPTION OF THE INVENTION

With reference to the attached Figures, an apparatus 1 for washing and separating pieces of plastics material P from contaminating material C is disclosed.

The processable plastics material P can be of various types, for example can comprise pieces coming from plastic films, containers, bottles and other objects. Such plastics material P, in particular but not in a limiting manner, mainly comes from milling plastics waste after consumption, which plastics waste is reduced into small sizes, i.e. into dimensions that go from values of the order of a few mm to values of the order of a few cm, with maximum values indicatively around 20-30 cm.

The plastics material P can be prewashed or not before being processed by the apparatus 1.

The plastics material P to be processed has contaminants C of various types that adhere thereto and which it is necessary to separate and remove. For this purpose, the apparatus 1 and the method according to the present invention, which are disclosed here below, intervene successfully.

The apparatus 1 comprises a washing container 2 suitable for receiving at the inlet an entering flow $F_{IN}$ of washing fluid W (such as water with possible additives) and the aforesaid pieces of plastics material P with which the contaminating material C to eliminated is aggregated.

In particular, the washing container 2 has a cylindrical shape and is bounded laterally by a side wall 13, and below by a bottom wall 10.

Inside the washing container 2, a stirring arrangement 5 is provided arranged per generating in the washing fluid W a turbulent stirring action for separating through mechanical action the contaminating material C adhering to the pieces of plastics P.

The stirring arrangement can comprise one or more stirrers 5. In particular, a stirrer 5 is provided of the type comprising blades 32, having a shaft 33, driven by an electric motor 34 and extending vertically inside the container 2.

The mechanical action that the blades 32 exert directly on the pieces of plastics P and the stirring and turbulent action of the fluid, generated by the blades 32 fitted on the rotary shaft 38, produce an action of shaking the pieces of plastics material P that effectively promotes the detachment of the contaminant bodies C from the pieces of plastics material P. The shaft 33 of the stirrer 5 is in an eccentric position with respect to a central longitudinal axis of the container 2. This particular positioning has the effect, in addition to leaving free a wide zone of stirring and of recirculating of the contaminated pieces P of plastics material, enables the mechanical turbulence and rubbing effect of the stirrer 5 to be increased, continuously disturbing and breaking up the tendency of rotatingly dragging the fluid W, increasing the turbulence T and intensifying the action of mechanical separation of the contaminants C from the pieces of plastics P.

In some experimental tests run with the apparatus 1 according to the invention, excellent results were obtained in the washing and separating action by driving the stirrer 5 at a rotation operating speed $V_O$ comprised between 250-450 rpm.

The entire volume defined inside the washing container 2 is affected by the mechanical turbulence and stirring action performed by the stirrer 3, unlike other known systems operating according to a different operating principle and comprising tanks divided by suitable baffles and vertical walls into stirring zones and quieting and decantation zones. In other words in the washing container 2 a single chamber is defined without any separating wall or baffle, this also making the entire apparatus 1 structurally simpler.

In the case of the present apparatus 1, the operating principle is based on the induction of mechanical turbulence and stirring substantially in the entire volume of the container, inasmuch as the main action that it is intended to perform is to detach through mechanical action the adhering contaminants C from the surfaces of the pieces of plastics P, and separating from the latter through decantation only the very heavy bodies such as metals or stones or the like that escape the hydrodynamic dragging action of the exiting fluid W.

The separation of the contaminants, in particular the lighter and medium weight contaminants, from the processed plastics P' can be entrusted to a possible further dedicated treatment unit located further downstream of the apparatus 1.

The apparatus 1 comprises a first supplying arrangement 7 suitable for supplying an entering flow $F_{IN}$ of washing fluid W inside the washing container 2. The washing fluid W in particular comprises water with possible additives.

The apparatus 1 comprises a second supplying arrangement 8 suitable for supplying the pieces of plastics material P in the washing container 2.

The first 7 and second supplying arrangements 8 are placed in a supplying zone 23 to the side of the washing container 2 and comprises in particular a hopper 8 for supplying pieces of plastics P, and a water distributor 7 configured for supplying the aforesaid entering flow F of washing fluid W.

The entering flow $F_{IN}$ is suitable for both dragging into the washing container 2 the pieces of contaminated plastics P, and for continuously refreshing the bath of water in the washing container 2. The pieces of plastics material P are supplied continuously to the hopper with the washing water.

In a position diametrically opposite the supplying zone 23 disclosed above, there is an outlet port 3 for evacuating by overflow the processed plastics material P' and an outlet flow $F_{out}$ of the washing fluid W conveying the contaminants C separated from the pieces of plastics P.

The outlet port 3 is bounded by a discharge channel 12 that projects transversely outside the side wall 13 of the washing container 2.

The discharge channel 12, diametrically opposite the aforesaid supplying zone 23, is bounded laterally by two side walls 15 and below by a ramp wall 16 that protrudes from a first height starting from the side wall 13 of the container 2 extending in a tilted manner upwards as far as a second higher height.

In the washing container 2, a single stirring and washing chamber is defined that is directly reached by the discharge channel 12. As already mentioned above, there is no division of the volume of the container 2 into a quieting zone and a stirring and turbulence zone.

The apparatus 1 comprises a controlled-conveying and retaining arrangement 4 for the plastics material P and a control unit $U_c$ configured for driving the controlled-conveying and retaining arrangement 4 so as to retain the plastics material P in the washing container 2 and advance in a controlled manner the quantity of processed plastics material P' to the outlet port 3 independently of the advancement of the outlet flow $F_{out}$ of washing fluid W.

The controlled-conveying and retaining arrangement comprises a rotating arrangement 4 of the continuous type, of the roller or drum type, or an equivalent conveying or dragging arrangement.

The rotating arrangement 4 of the continuous type is driven by a variable speed motor arrangement 19. In particular, the controlled-conveying and retaining arrangement 4 is driven by an electric motor 19 of the inverter type.

The rotating arrangement 4 of the continuous type, such as a roller element 4 or a drum element 4, is placed near and upstream of the outlet port 3.

The roller or drum rotatable element 4, is on a horizontal rotation axis R, and extends between the two side walls 15 of the discharge channel 12 and above the aforesaid ramp wall 16 of the channel.

The rotatable element 4 comprises a shaft 17 from which there project radially, and according to axial planes, blades 14 that are suitable for interacting with the plastics material P.

To the blades 14 reinforcing baffles 18 are connected that are transverse to the shaft 17.

The rotatable element 4 is positioned in height with respect to the ramp wall 16, such that the blades 14 skim or partially penetrate the washing fluid W below the free surface 30, to intercept the pieces of plastics P.

The control unit $U_c$ is configured for rotating the roller element 4 at a rotation speed $V_R$ that is such as to force the plastics material P to dwell in the washing container 2 for a set average dwell time $T_P$ sufficient for obtaining a desired degree of purity and decontamination for the plastics material P.

The rotation speed $V_R$ of the roller element 4 is chosen appropriately on the basis of the characteristics of the material P to be processed, and of the degree of purity and decontamination that it is desired to obtain, to which a set dwell time $T_P$ in the washing container 2 corresponds. Merely by way of non-limiting example, the rotation speed $V_R$ can adopt values comprised between 10 and 30 rpm.

The unit $U_C$ is operationally connected to the first supplying arrangement 7 for adjusting the inlet and outlet flowrates $Q_{IN,OUT}$ of the washing fluid W to impose a desired "refresh" degree of the washing fluid W inside the washing container 2.

The unit $U_C$ is programmed for adapting, to the overflow effect and the hydrodynamic dragging action exerted by the fluid W, a braking or dragging action, depending on circumstances, that the roller element 4 has to perform on the pieces of plastics P to ensure the requested dwell time $T_P$ of the plastics material P inside the washing container 2 is reached. The control unit $U_c$ is operationally connected to the second supplying arrangement 8 to adjust the quantity or flow of plastics material P to be supplied to said washing container 2.

In order to provide an approximate indication, by way of example, of the flowrates of fluid and of plastics material P to be processed, values can be indicated that are variable between 30 and 50 m³/h for the flowrates of fluid W (according to the desired refresh degree), and 400-600 Kg/h for the plastics material P to be cleaned.

The control unit $U_C$ is configured for being able to drive selectively and mutually independently, the first 7 and second supplying arrangement 8, and the roller element 4, in order to set a suitable refresh degree of the washing fluid W and ensure, that a set dwell time $T_P$ is reached of the plastics material P in the container 2 independently of one another.

A sensor 25 is provided for measuring the level of the washing fluid W in the washing container 2. The control unit $U_C$ acts for controlling the first 7 and second supplying arrangement 8 (water and plastics material P) on the basis of the signal of the aforesaid sensor 25 and for controlling the operating speed $V_O$ of the stirrer/s 5.

The apparatus 1 is moreover provided with a bulkhead 6 arranged upstream of the outlet port 3 and shaped for acting as a barrier and diverting and guiding to the stirrer 5 the pieces of plastics P, placed on the surface or at a reduced depth with respect to the free surface 30 of the washing fluid W.

Figure 6:
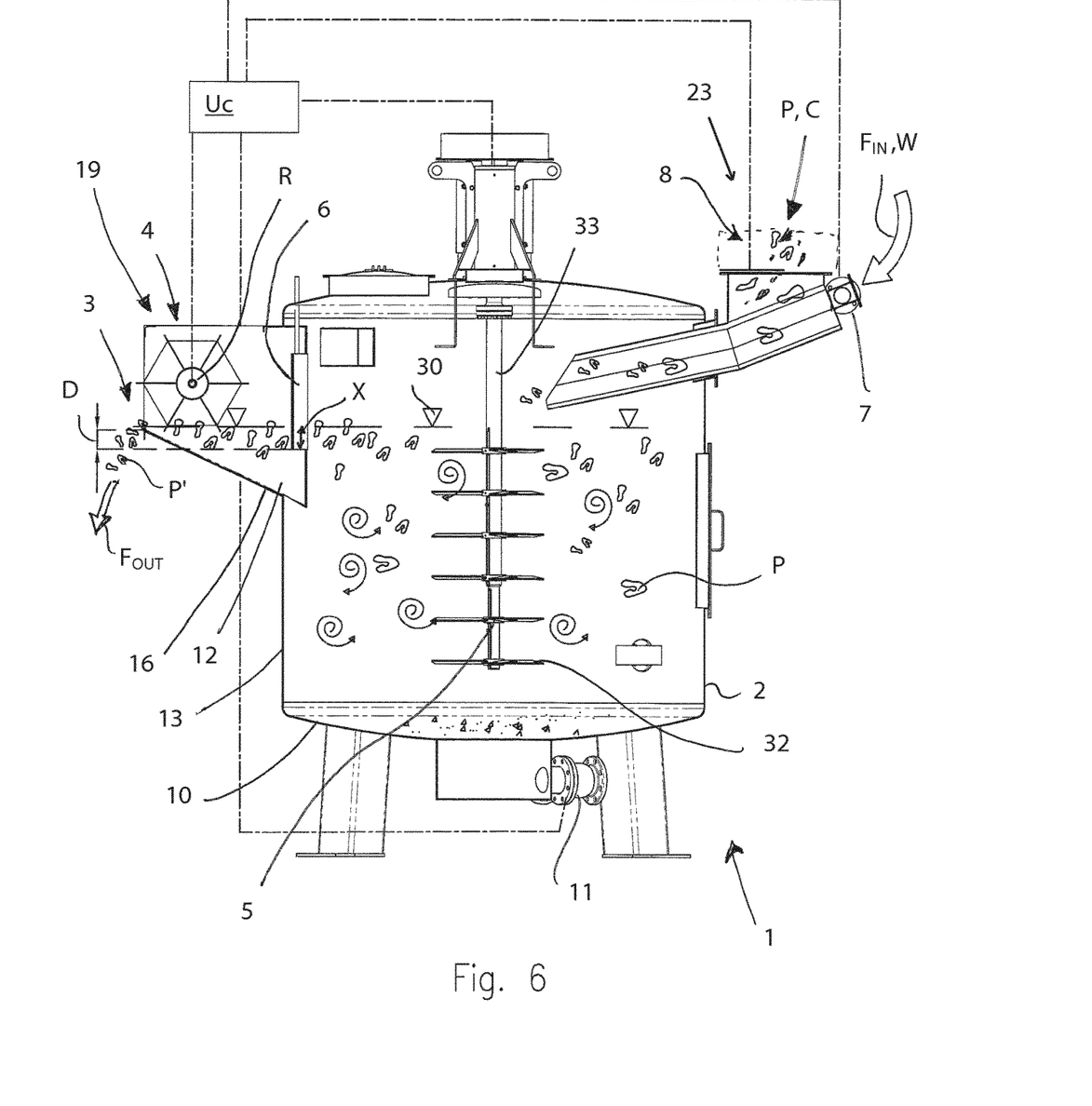
FIG. 6 is a vertical cross section according to line VI-VI of FIG. 4.
Figure 6A:
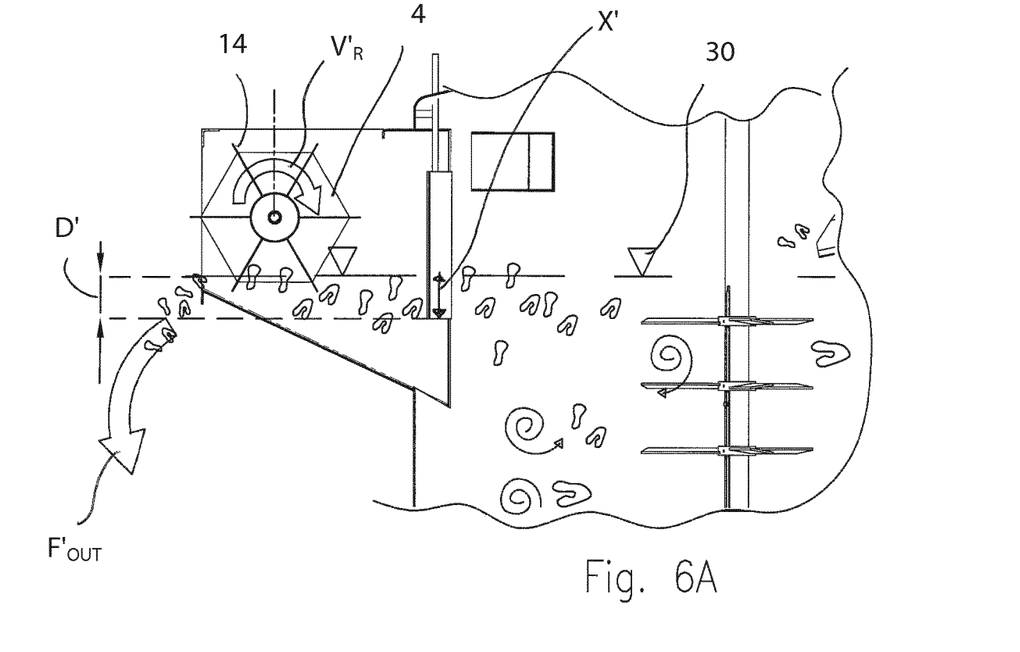
FIGS. 6A and 6B are enlarged and schematic details of the apparatus in operation according to two different operating modes that serve as examples.
Figure 6B:
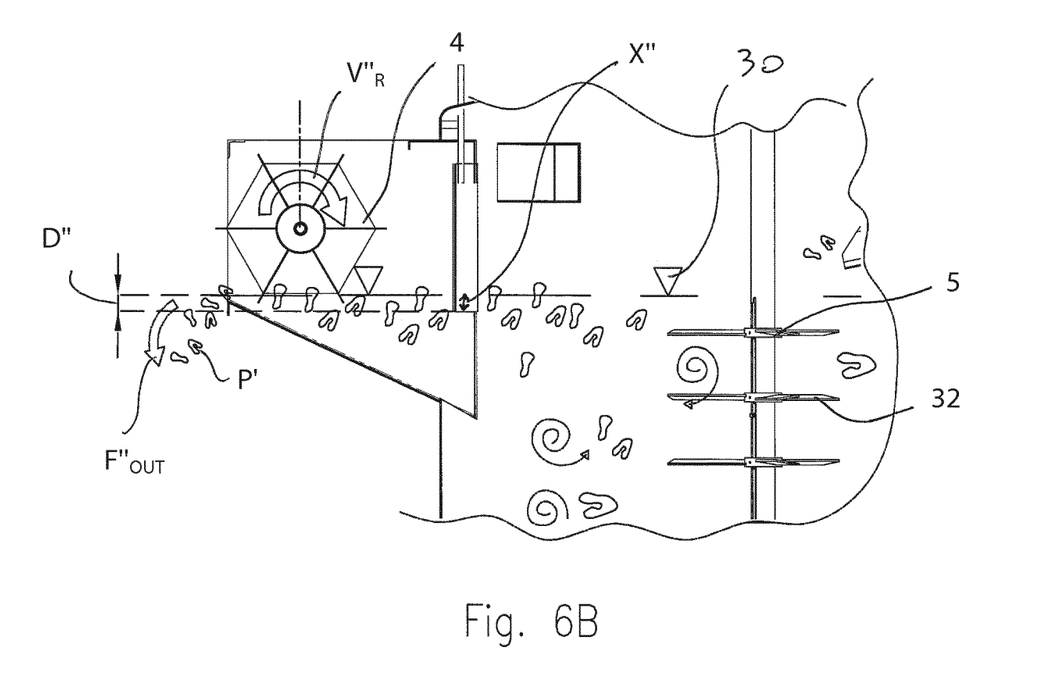

In particular, a bulkhead 6 is provided that extends vertically and is adjustable in height to vary the immersion length X thereof in the washing fluid W as far as a required depth D with respect to the free surface 30, depending on the features of the processed material P and on geometric and/or process parameters. The immersion depth D of the bulkhead 6 has a value that is variable according to various parameters, but does not anyway exceed values of the order of a few cm, for example does not go beyond 5 cm. FIGS. 6A and 6B show by way of example two different degrees of immersion of the bulkhead 6, with a greater depth D' and immersion length X' in FIG. 6A, and a lesser depth D" and immersion length X" in FIG. 6B.

Figure 1:
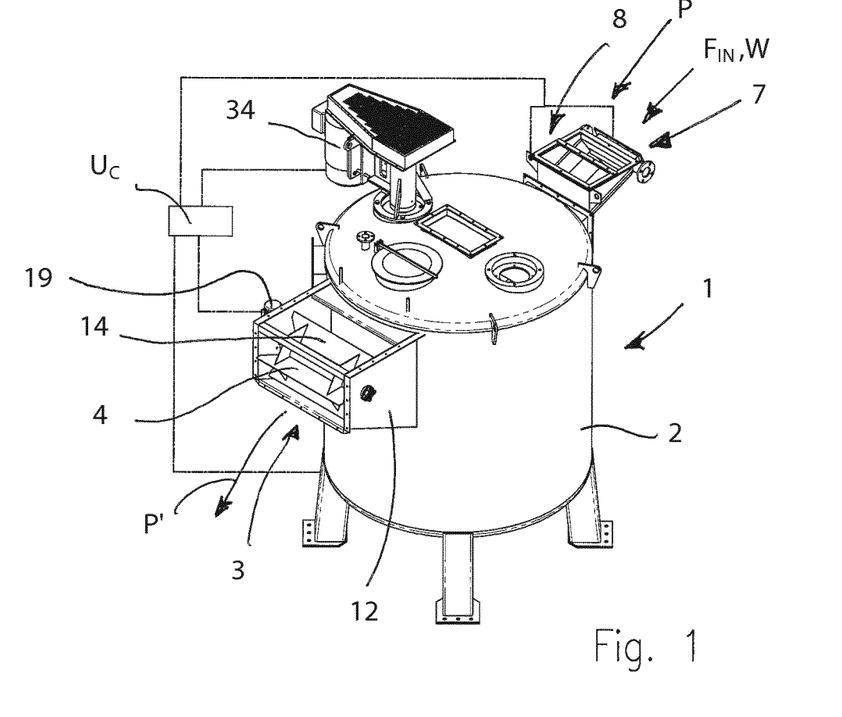
FIGS. 1 and 2 are respectively a perspective view and a top view of the apparatus according to the present invention.
Figure 2:
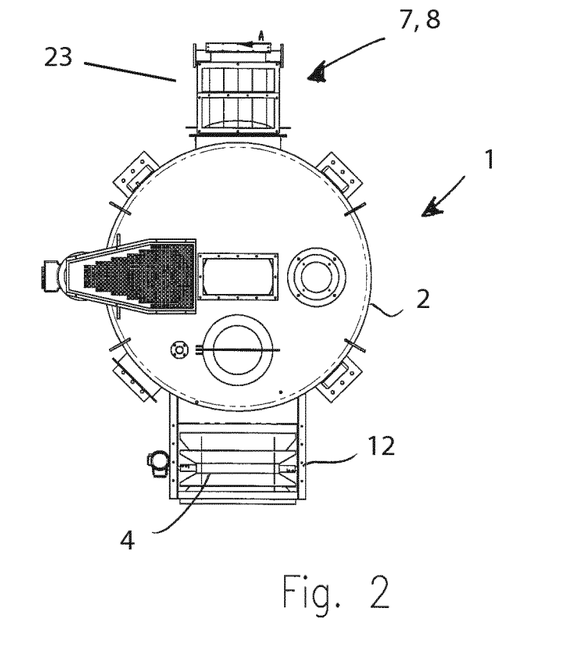
Figure 3:
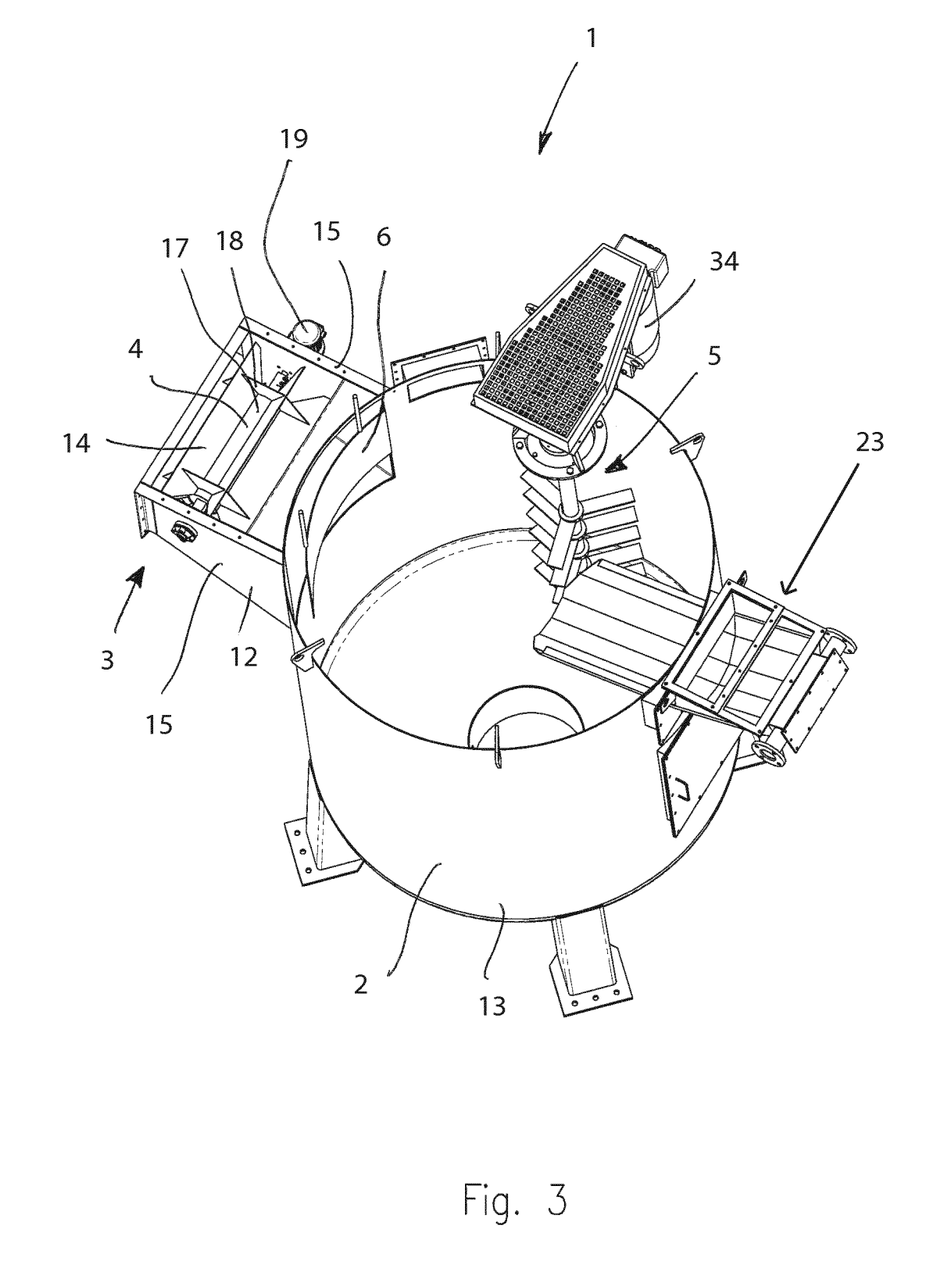
FIG. 3 is a perspective view in which the apparatus is visible internally.
Figure 4:
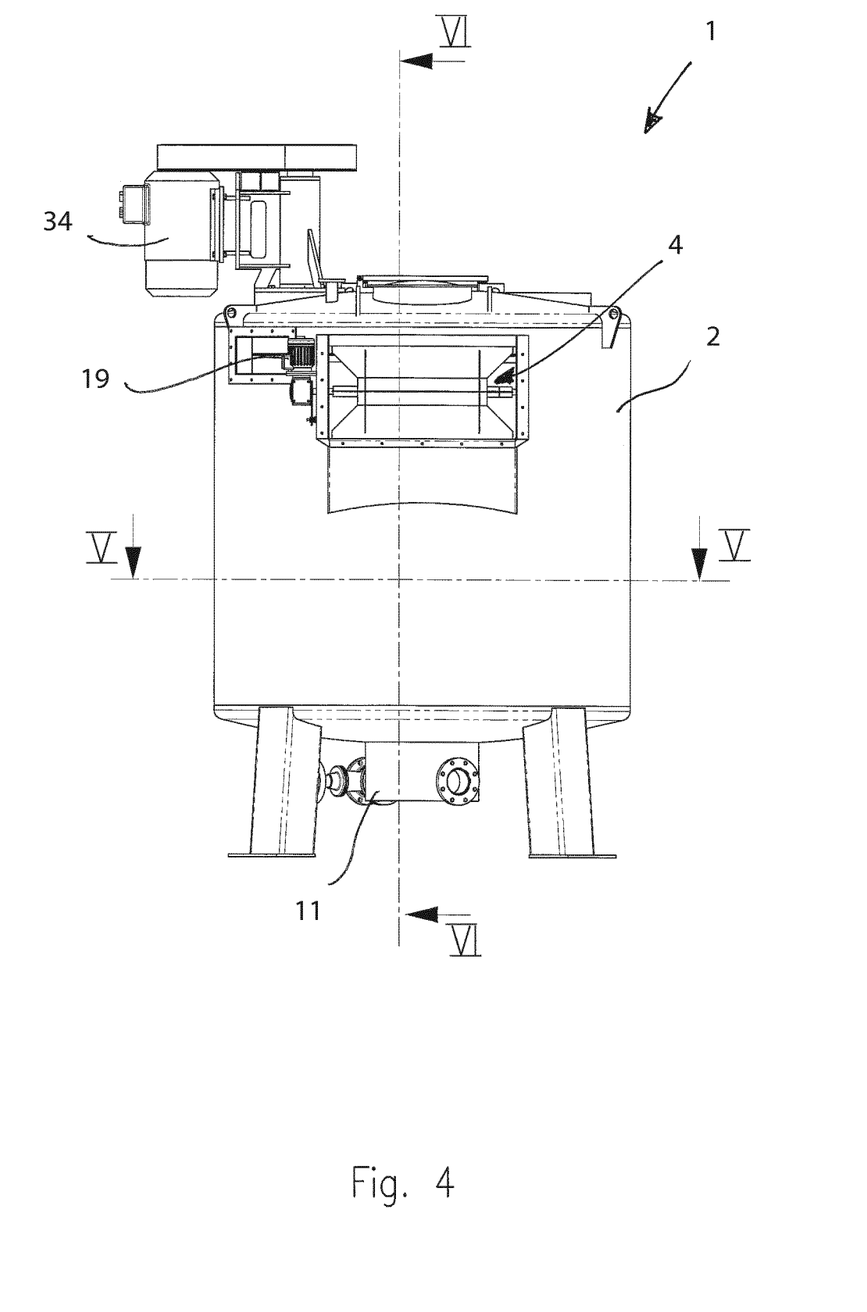
FIG. 4 is a side view of the unit of the apparatus of the invention.
Figure 5:
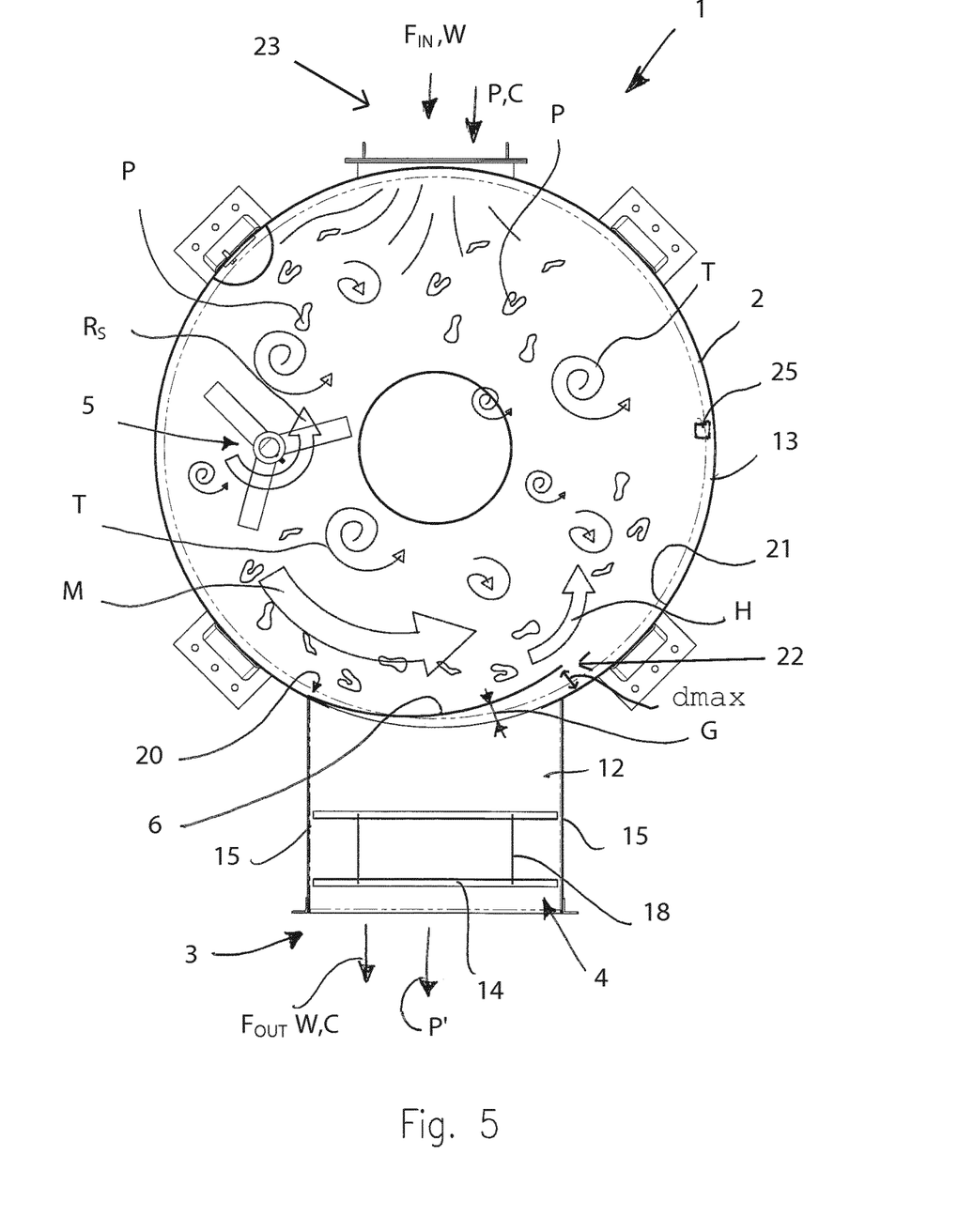
FIG. 5 is a vertical cross section according to line V-V of FIG. 4.

With reference to FIG. 5, the bulkhead 6 has a vertical first edge zone 20 arranged substantially in contact with or very near an inner bounding surface 21 of the washing container 2, and a second vertical edge zone 22 arranged at a maximum distance $d_{max}$ from the aforesaid inner surface 21.

The first edge zone 20 is positioned so as to be, with respect to a prevalent rotation direction M of the washing fluid W in the container 2, further upstream with respect to the second edge zone 22. The bulkhead 6 extends from the first edge zone 20 to the second edge zone 22 at a progressively increasing distance from the inner surface 21. In particular, the bulkhead 6 has a geometry that is curved and concave towards the inside of the washing container 2 and defines a cavity or gap G that is variable with respect to the wall of the container 2. The bulkhead 6, with such geometrical shape and position, has the function of preventing the material P that has just been introduced from following preferential paths on the surface and immediately reaching the outlet 3 of the container 2. In particular, the bulkhead 6 has the function of diverting—away from the outlet port 3—the pieces of plastics material P that as soon as they are poured into the container 2, in a buoyant condition, tend to reach directly the outlet zone of the washing container 2, escaping the action of the stirrer 5. The bulkhead 6 thus guides the pieces of plastics material P to the stirrer 5, forcing the pieces of plastics material P to be subjected to the turbulent stirring action so that the contaminants C adhering to the pieces of plastics material P are detached and separated.

The bulkhead 6 thus acts as a brake and diverting barrier, creating upon itself a bunching of material P that is forced to be dragged progressively by the vortex motion induced by the stirrer 5 and thus be stirred mechanically, causing the contaminants C to be detached and separated.

The bulkhead 6 thus performs an action that by combining synergically with that of the roller element 4 enables all the plastics material P entering the washing container 2 to be processed effectively.

The apparatus further comprises a valve or pump evacuating device 11 for the periodic removal of possible heavier contaminant materials (the aforementioned metal bodies, stones, etc) that are deposited on the bottom 10 of the washing container 2.

The operation is now disclosed briefly of the apparatus 1 that has just been disclosed and of the method according to the present invention.

Figure 7:
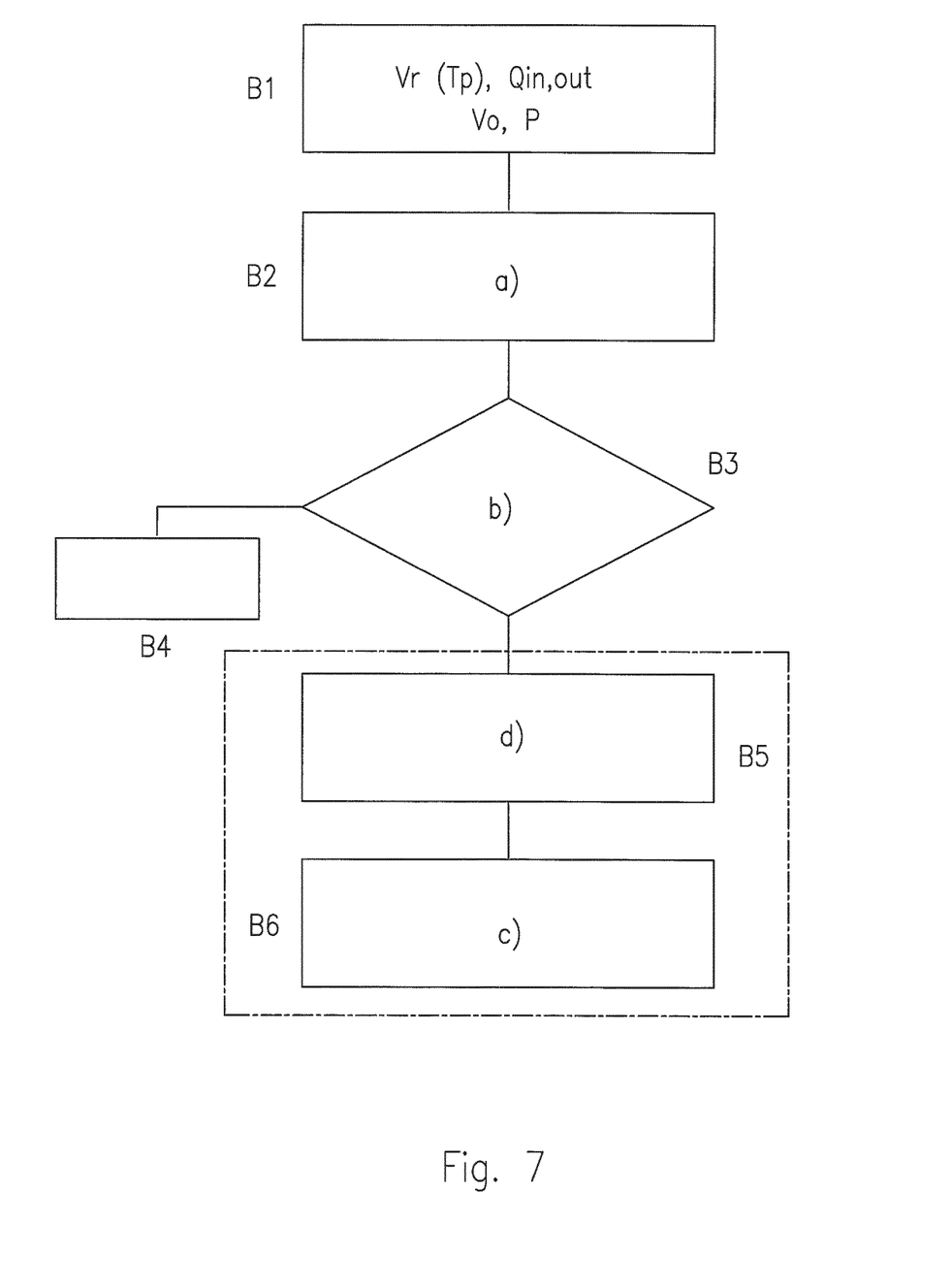
FIG. 7 is a block diagram relating to a method according to the invention for washing and separating a plastics material.

With the help of the block diagram of FIG. 7, the washing and separating method according to the invention is disclosed, which is implemented by the apparatus 1 that has just been disclosed.

Before processing the plastics material P, the flowrate values Q of the exiting and entering washing fluid W are set according to the desired degree of "refresh", the operating speed $V_o$ of the stirrer is set and the rotation speed $V_R$ of the roller element 4 is determined to which a corresponding dwell time $T_P$ at a set degree of purity will be assigned that it is desired to obtain for the plastics material P (block B1 in FIG. 7).

The pieces of plastics material P, containing contaminants C to be removed, are loaded together with the washing fluid W in the washing container 2 (block B2, step a) of the method).

Inside the washing container 2 the stirring step b) (block B3) occurs: the pieces of plastics P and the contaminants C are subjected to an intense turbulence and stirring action that facilitates detachment of the contaminants C. In the container 2, the contaminants C are then separated mechanically from the surfaces of the pieces of plastics P.

During washing, the very heavy contaminant bodies (stones, metals, etc.) drop by the force of gravity onto the bottom of the container 2, from which they can be periodically evacuated by driving the corresponding valve system 11 (block B4).

The blocks B5 and B6 represent the controlled retaining and conveying step d) (block B5) and evacuation by overflow step c) (block B6).

The washing fluid W conveys with itself the contaminants C that have been detached from the plastics material P and is evacuated by overflow (step c)) through the outlet port 3, regardless of the flow of already processed plastics material P' the exit of which is on the other hand controlled by the roller element 4 (step d).

During the step d), the control unit $U_c$ controls the rotation of the roller element 4 at a rotation speed $V_R$ that is such as to force the plastics material P to dwell in the washing container 2 for the average dwell time $T_P$ sufficient to obtain the desire degree of purity and decontamination for the plastics material P.

The roller element 4 thus acts as a barrier with controlled release of the pieces of plastics P.

The dwell time $T_P$ can vary from a few seconds to a few minutes (e.g. 3-4 mins); dwell time will be reduced when it is deemed to be unnecessary to obtain high degrees of purity and it is desired to economise on process consumption and process huge quantities of plastics material in a limited time. On the other hand, there will be a greater dwell time, possibly combined with a high degree of "refresh" of the fluid W, when it is desired to obtain qualitatively better exiting plastics material P that is more finely cleaned and is thus provided with a greater commercial value.

Owing to the particular structural and functional conformation of the apparatus 1 provided with the unit $U_c$ and with the roller element 4, it is possible to decide the best compromise between quality and consumption, choosing between the innumerable different operating modes the operating mode that is each time most suitable for the specific needs.

As disclosed above, in the event of operation with a high degree of change of the washing fluid W, thus with high inlet and outlet flowrates $Q_{in,out}$ of the washing fluid W and a great overflow effect, the roller element 4 acts to slow the flow of plastics material exiting the outlet flow $F_{out}$ of the W, by counteracting the hydrodynamic dragging action to the outlet port 3. The pieces P' of plastics material are released gradually to the outlet port. The bunching and the retaining induced by both the bulkhead 6 and by the roller element 4 forces the material P not to escape the mechanical stirring action performed by the stirrer 5.

If it is chosen to operate with reduced water inlet and outlet flowrates $Q_{in,out}$, with limited overflow and minimum dragging hydrodynamic effect, driving the roller element 4 is controlled to perform a dragging effect that facilitates the advancement of the processed plastics material P to the outlet port 3. FIGS. 6A and 6B, by way of example, show two different operating conditions corresponding respectively to a high quality of obtained material P and a lower quality of material P but with reduced washing fluid (W) consumption and more rapid processing time. In the former condition there is a high flow F' out of water and a slower rotation speed $V_R$ of the roller element 4.

In the latter case of FIG. 6B there is on the other hand a lesser consumption of fluid (limited flow F''out) and a higher rotation speed $V_R$ of the roller element 4.

Naturally, the various operating parameters can be combined differently according to specific needs.

From what has been disclosed and shown in the drawings, it is clear that the washing and separating method and apparatus 1 according to the invention successfully achieve the set aims.

The method and the apparatus disclosed above enable high levels of purity in the recovered plastics material to be obtained in processing times that are reduced with respect to known stirring systems, or enable significant water consumption savings to be made without excessively penalising the quality of the product obtained, all this owing to the presence of the speed-controlled roller element 4 and the possible bulkhead 6 that in synergy with the action of the roller element 4 ensures uniform washing treatment for all the plastics material P that is supplied to the washing container 2.

The increase of the efficacy of the washing action of the apparatus and method makes it possible to save consumption of water, additives and electric energy for the same degree of purity of the material obtained with respect to prior art systems.

Significant economic advantages are thus obtained by a technical solution that is as effective as it is functionally and constructionally simplified.

Modifications to and variants on the method and/or the apparatus 1 can be made without thereby moving outside the scope of the claims.

In particular, the geometrical conformation, dimensions, position and materials that make up one or more parts of the apparatus 1 can be chosen and/or optimised opportunely on the basis of specific needs and materials to be processed.

The invention claimed is:

1. An apparatus for washing and separating pieces of plastics material, from contaminating material, comprising:
 a washing container configured for receiving said pieces of plastics material with contaminating material and a washing fluid,
 a first supplying device configured for supplying an entering flow of said washing fluid in said washing container,
 a second supplying device configured for supplying said pieces of plastics material with contaminating material into said washing container,
 a stirring device arranged vertically in said washing container for generating in an entire volume of said container containing said washing fluid a turbulent stirring action for separating through mechanical action the contaminating material from said pieces of plastics material,
 an outlet port for evacuating by overflow said pieces of plastics material and an outlet flow of said washing fluid with contaminating material,
 a controlled-conveying and retaining device for said pieces of plastics material and a control unit configured for driving said controlled-conveying and retaining device to retain said pieces of plastics material in said washing container and advance in a controlled manner said pieces of plastics material to said outlet port independently of the advancement of said outlet flow of washing fluid, and
 a bulkhead arranged upstream of said outlet port, extending vertically and adjustable in height to vary its immersion length in the washing fluid with respect to a surface thereof, said bulkhead having a vertical first edge zone arranged substantially in contact with or in proximity of an inner surface of said washing container, and a vertical second edge zone arranged at a distance from said inner surface, said bulkhead being configured as a barrier for diverting to said stirring device said pieces of plastics material placed on or near the surface of the washing fluid.

2. An apparatus according to claim 1, wherein said controlled-conveying and retaining device comprises, near and upstream of said outlet port, a rotating device of a continuous roller or drum type driven by a variable speed motor.

3. An apparatus according to claim 2, wherein said motor comprises an electric motor of inverter type, and wherein said outlet port is bounded by a discharge channel that projects transversely outside from a side wall of said washing container, said discharge channel being diametrically opposite a supplying zone for said pieces of plastics material with contaminating material and for said washing fluid.

4. An apparatus according to claim 3, wherein said rotating device comprises a rotatable element with a horizontal rotation axis, extending between two side walls of said discharge channel and above a ramp wall of said channel.

5. An apparatus according to claim 4, wherein said rotatable element comprises a shaft from which blades project radially and according to axial planes for interacting with said pieces of plastics material with contaminating material, said shaft further including transverse reinforcing baffles to connect said blades to said shaft, said rotatable element being arranged in a height position relative to said ramp wall such that said blades skim or partially penetrate said washing fluid below the surface, to intercept said pieces of plastics material.

6. An apparatus according to claim 1, wherein said control unit is configured for rotating said controlled-conveying and retaining device at a rotation speed to force said pieces of plastics material with contaminating material to dwell in said washing container for a set average dwell time sufficient to separate said pieces of plastics material from said contaminating material.

7. An apparatus according to claim 6, wherein said control unit is operationally connected to said first supplying device for adjusting inlet and outlet flowrates of said washing fluid to impose a set refresh degree of said washing fluid inside said washing container, said control unit being programmed for adapting, to an overflow effect and hydrodynamic dragging action exerted by said washing fluid, a braking or dragging action of said controlled-conveying and retaining device on said pieces of plastics material to ensure that the set average dwell time of said pieces of plastics material in said washing container is reached, said control unit being connected to said second supplying device to adjust a quantity or flow of said pieces of plastics material with contaminating material to be supplied to said washing container.

8. An apparatus according to claim 1, wherein said vertical first edge zone is positioned with respect to a prevalent rotation direction of said washing fluid in said container further upstream than said vertical second edge zone, said bulkhead extending from said vertical first edge zone to said vertical second edge zone at a progressively increasing distance from said inner surface of said washing container and with a curved geometry which is concave to the inner surface of said washing container.

9. An apparatus according to claim 1, wherein said control unit is configured for selectively and independently driving said first and second supplying devices and said controlled-conveying and retaining device to refresh said washing fluid and impose a dwell time of said pieces of plastics material in said container independently of one another.

10. An apparatus according to claim 1, and further comprising a sensor for measuring a level of said washing fluid in said washing container, said control unit acting to control said first and second supplying devices on the basis of a signal of said sensor and for controlling an operating speed of said stirring device.

11. An apparatus according to claim 1, and further comprising a valve or pump evacuating device for removal of the contaminating material that is deposited on a bottom of said washing container.

* * * * *